Oct. 14, 1930.  W. R. MARKWICK  1,778,459
STABILIZER FOR CAM OPERATED MECHANISMS
Filed Feb. 9, 1929
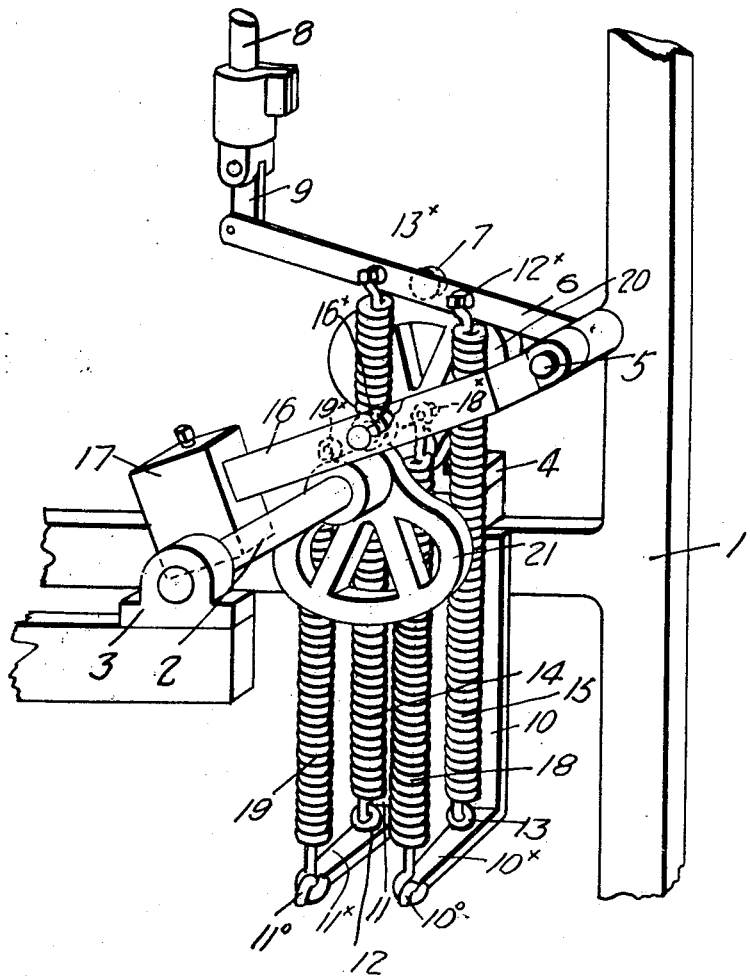
INVENTOR
W. R. MARKWICK.
BY
ATTORNEYS.

Patented Oct. 14, 1930

1,778,459

UNITED STATES PATENT OFFICE

WALTER ROBERT MARKWICK, OF MOUNT DENNIS, ONTARIO, CANADA

STABILIZER FOR CAM-OPERATED MECHANISMS

Application filed February 9, 1929. Serial No. 338,792.

My invention relates to improvements in stabilizers for cam operated mechanisms, and the object of the invention is to provide simple means for equalizing the cam movement so that it will be unaffected by the load when imparting vertical movement to a vertically movable member acting as the load when opposing or unopposing the movement of the cam during the lifting and return movement of the load as the cam revolves, and it consists essentially of the arrangement and construction of parts as hereinafter more particularly explained.

The figure represents a perspective view of my stabilizing mechanism.

1 indicates a machine frame on which is mounted a shaft 2 in bearings 3 and 4. 5 is a stud carried by the frame. 6 is a lever swung upon the stud and on which is journalled a cam roller 7. 8 is a movable member, such as a shaft which is mounted in suitable bearings and connected by a link 9 to the free end of the lever 6. 10 and 11 are hanger brackets secured to the frame and provided at their lower ends with horizontal extensions 10$^x$ and 11$^x$ provided with hooked ends 10° and 11° and eyes 12 and 13. 14 and 15 are tension springs secured to their lower ends to the eyes 12 and 13 and at their upper ends by cap screws 12$^x$ and 13$^x$ to the lever 6. 16 is a supplemental lever which is swung freely upon the stud 5 and provided at its free end with a weight 17. 18 and 19 are tension springs connected at their lower ends to the hooks 10° and 11° and at their upper ends to cap screws 18$^x$ and 19$^x$ in the lever 16.

The lever 16 is provided with a cam roller 16$^x$.

20 is a cam secured to the shaft 2 and coacting with the cam roller 7 of the lever 6. 21 is a cam similar to the cam 20 reversely set and also secured to the shaft 2 so as to coact with the cam roller 16$^x$ of the lever 16.

As the cams revolve the cam 20 coacts with the roller 7 to raise the lever 6 to lift the load, the cam roller 16$^x$ revolving freely in contact with the short radius of the cam 21. As the cams 20 and 21 revolve so that the lever 6 tends to fall aided by the pressure of the load represented by the shaft 8, the cam 21 engaged by the roller 16$^x$ exerts a lift on the lever 16 and the weight 17 which thereby opposes the downward pressure of the load 8 so as to equalize the movement, the springs 14 and 15, 18 and 19 holding the levers 6 and 16 and their cam rollers 7 and 16$^x$ in engagement with their respective cams.

It will thus been that the turning movement of the cam 21 is resisted by the weight 17 and as the cam 21 is secured to the shaft 2 the downward swing of the cam 20 which is normally accelerated by the weight of the load, particularly when operating at high speed, is also resisted. Such acceleration is thus prevented and the turning movement of the cam rendered uniform at all times no matter at what speed the mechanism is operated.

From this description it will be seen that I have devised a very simple device which will positively equalize the movement of the cam mechanism operating against a vertical load so that the upward and downward movement of the load will not effect the movement of the cam, and thereby provide a very much evener cam movement and permit the cam mechanism to operate much more rapidly than would be possible otherwise so that the travel of the parts is smooth and even.

What I claim as my invention is:—

In a stabilizer for cam operated mechanisms, the combination with a suitable supporting structure, a cam shaft mounted in the structure, and a vertically movable load carrying member, of a pair of cams secured to the shaft and set in opposite directions, a pair of levers, a single pivot member mounted on a suitable supporting structure at one side of the cam shaft, said pair of levers mounted thereon to swing independently, a cam roller mounted on each lever intermediate of its length so as to bear against diametrically opposite sides of the cams, a weight carried by one lever adjacent its free end, a pivotal connection between the free end of the other lever and the load carrying member, and a tension spring connecting each lever to the suitable supporting structure.

WALTER ROBERT MARKWICK.